United States Patent
Bok et al.

(10) Patent No.: US 11,237,661 B2
(45) Date of Patent: Feb. 1, 2022

(54) DISPLAY MODULE AND DISPLAY DEVICE INCLUDING THE SAME

(71) Applicant: Samsung Display Co., Ltd., Yongin-si (KR)

(72) Inventors: Seung-Iyong Bok, Hwaseong-si (KR); Kicheol Kim, Yongin-si (KR); DongHo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 16/893,386

(22) Filed: Jun. 4, 2020

(65) Prior Publication Data

US 2020/0393946 A1 Dec. 17, 2020

(30) Foreign Application Priority Data

Jun. 14, 2019 (KR) ........................ 10-2019-0070887

(51) Int. Cl.
*G06F 3/041* (2006.01)
*G06F 3/044* (2006.01)

(52) U.S. Cl.
CPC ........ *G06F 3/04146* (2019.05); *G06F 3/0412* (2013.01); *G06F 3/0446* (2019.05); *G06F 3/0447* (2019.05); *G06F 2203/04103* (2013.01); *G06F 2203/04105* (2013.01)

(58) Field of Classification Search
CPC . G06F 2203/04103; G06F 2203/04105; G06F 3/0412; G06F 3/0414; G06F 3/04146; G06F 3/044; G06F 3/0446; G06F 3/0447

USPC .................................................. 345/170–178
See application file for complete search history.

(56) References Cited

U.S. PATENT DOCUMENTS

| | | | |
|---|---|---|---|
| 10,007,371 B2 | 6/2018 | Kim et al. | |
| 10,289,225 B2 | 5/2019 | Jin et al. | |
| 10,306,773 B2 | 5/2019 | Kim et al. | |
| 2015/0062927 A1* | 3/2015 | Hirakata | H05K 5/0017 362/362 |
| 2015/0248149 A1* | 9/2015 | Yamazaki | G06F 1/263 361/679.27 |
| 2017/0235427 A1 | 8/2017 | Heikkinen et al. | |
| 2017/0308212 A1* | 10/2017 | Jin | G06F 3/0443 |
| 2018/0032188 A1 | 2/2018 | Park et al. | |
| 2018/0039372 A1* | 2/2018 | Cho | G06F 3/0412 |
| 2018/0224990 A1* | 8/2018 | Shim | G06F 3/0484 |
| 2018/0232092 A1 | 8/2018 | Lee et al. | |
| 2018/0269262 A1 | 9/2018 | Ito | |

(Continued)

FOREIGN PATENT DOCUMENTS

| | | |
|---|---|---|
| KR | 10-1681305 B1 | 12/2016 |
| KR | 10-2017-0121904 A | 11/2017 |

(Continued)

*Primary Examiner* — Tony O Davis
(74) *Attorney, Agent, or Firm* — Lewis Roca Rothgerber Christie LLP

(57) ABSTRACT

A display module includes a display panel, a touch sensor, and a pressure sensor. A base member of the display panel includes a first portion, a second portion extending from the first portion, and a third portion extending from the second portion. The touch sensor is disposed on the first portion of the base member. The pressure sensor is disposed on the third portion of the base member. When the second portion of the base member is bent, the pressure sensor overlaps the first portion of the base member.

20 Claims, 15 Drawing Sheets

(56) References Cited

U.S. PATENT DOCUMENTS

| | | | |
|---|---|---|---|
| 2019/0033653 A1* | 1/2019 | Cho | G02F 1/133305 |
| 2019/0114004 A1* | 4/2019 | Lee | G06F 3/0446 |
| 2019/0179447 A1* | 6/2019 | Kim | G06F 3/0443 |
| 2019/0179470 A1* | 6/2019 | Hong | G06F 1/1652 |
| 2019/0317621 A1* | 10/2019 | Lee | G06F 3/04142 |
| 2019/0384441 A1* | 12/2019 | Seo | G06F 3/04182 |
| 2019/0391692 A1* | 12/2019 | Park | G01L 1/18 |
| 2020/0033971 A1* | 1/2020 | Lee | H03K 17/9625 |
| 2020/0056955 A1* | 2/2020 | Lee | G01M 99/008 |
| 2020/0057523 A1* | 2/2020 | Park | G06F 3/044 |
| 2020/0201465 A1* | 6/2020 | Lee | G06F 1/1643 |
| 2020/0201484 A1* | 6/2020 | Lee | G06F 3/0445 |
| 2020/0233461 A1* | 7/2020 | Kim | G06F 1/1681 |
| 2020/0257334 A1* | 8/2020 | Han | G06F 1/1652 |
| 2020/0293140 A1* | 9/2020 | Seo | G06F 3/0414 |
| 2020/0310580 A1* | 10/2020 | Han | G06F 3/0414 |
| 2020/0312918 A1* | 10/2020 | Lee | G06F 3/04142 |
| 2020/0341576 A1* | 10/2020 | Kahng | G06F 3/047 |
| 2021/0026484 A1* | 1/2021 | Kim | G06F 3/044 |
| 2021/0096720 A1* | 4/2021 | Seomoon | G06F 3/04144 |
| 2021/0117064 A1* | 4/2021 | Lee | G06F 3/0418 |
| 2021/0141454 A1* | 5/2021 | Ko | G06F 3/04146 |
| 2021/0173437 A1* | 6/2021 | Bae | G06F 1/1626 |
| 2021/0294475 A1* | 9/2021 | Lee | G06F 3/04146 |

FOREIGN PATENT DOCUMENTS

| | | |
|---|---|---|
| KR | 10-1841583 B1 | 3/2018 |
| KR | 10-1908463 B1 | 10/2018 |

* cited by examiner

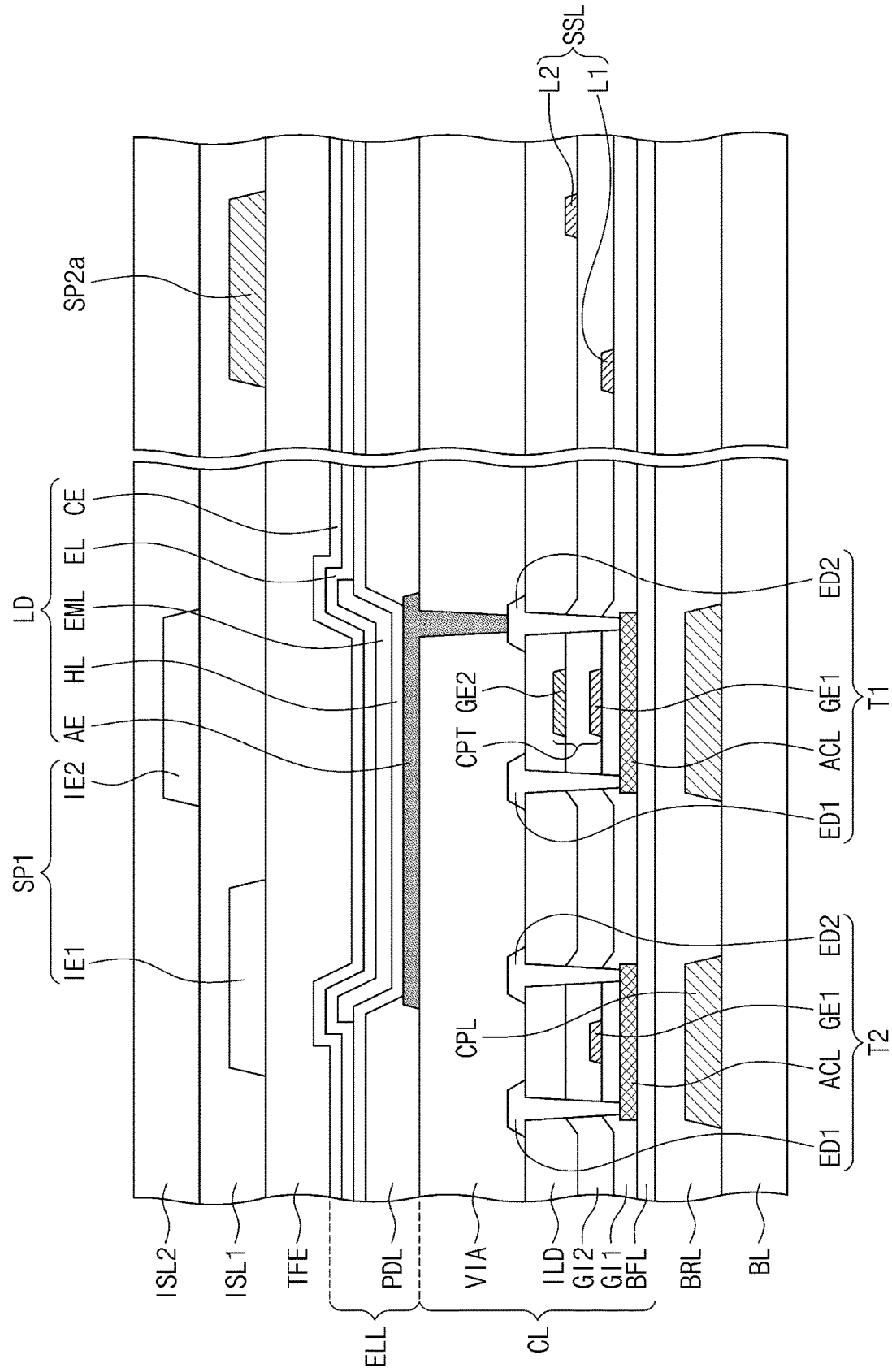

DISPLAY MODULE AND DISPLAY DEVICE INCLUDING THE SAME

CROSS-REFERENCE TO RELATED APPLICATION

This application claims priority to and the benefit of Korean Patent Application No. 10-2019-0070887, filed on Jun. 14, 2019, the entire content of which is hereby incorporated by reference.

BACKGROUND

The present disclosure herein relates to a display module capable of detecting a user's touch and a pressure applied by a user and a display device including the same.

Various display devices used for multimedia devices such as a television, a mobile phone, a tablet computer, a navigation unit, and a game console have been developed. These display devices may each include a keyboard and/or a mouse as an input unit.

In recent years, a display device includes, as an input unit, an input sensing circuit capable of detecting a user's touch and/or a pressure applied by a user.

The display device may recognize a human finger contacting a screen and/or the like through the input sensing circuit. The input sensing circuit may have various suitable touch detecting methods including a resistive film method, an optical method, a capacitive method, and/or an ultrasonic method. The capacitive method of the above-described methods detects whether a touch is generated by using a capacitance varied when a touch generation unit contacts the screen of the display device.

Also, the display device may detect a pressure applied to the screen.

SUMMARY

Aspects of embodiments of the present disclosure provide a display module capable of detecting a user's touch and a pressure applied by a user and a display device including the same.

An embodiment of the present disclosure provides a display module including a base member, a circuit layer, a light emitting element layer, an encapsulation layer, a first sensor, and a second sensor.

The base member includes a first portion, a second portion extending from the first portion, and a third portion extending from the second portion.

The circuit layer is disposed on the first portion of the base member, and includes a plurality of transistors.

The light emitting element layer is disposed on the circuit layer, and includes a plurality of light emitting elements electrically connected to the plurality of transistors.

The encapsulation layer seals the light emitting element layer.

The first sensor is disposed on the encapsulation layer.

The second sensor is disposed on the third portion of the base member to detect a pressure applied from the outside.

When the second portion of the base member is bent, the second sensor overlaps the first portion of the base member.

In an embodiment, the display module may further include a plurality of pads, a printed circuit board, and an input sensing driving circuit.

The plurality of pads may include a plurality of first pads configured to transmit an electrical signal to the plurality of transistors, a plurality of second pads electrically connected to the first sensor, and a plurality of third pads electrically connected to the second sensor, and overlap the third portion of the base member.

The printed circuit board may be electrically connected to the plurality of pads.

The input sensing driving circuit may be mounted to the printed circuit board, and electrically connected to the plurality of second pads and the plurality of third pads.

In an embodiment, the display module may further include a data driving circuit. The data driving circuit may be disposed between the plurality of pads and the second sensor and electrically connected to the plurality of first pads.

In an embodiment, the second sensor may include a plurality of electrodes, and when a pressure is applied from the outside, a capacitance provided by the plurality of electrodes may be varied.

In an embodiment, the second sensor may include a strain gauge.

In an embodiment, a material contained in the first sensor may be the same as that contained in the second sensor.

In an embodiment, the first portion, the second portion, and the third portion may be integrated with each other to provide the base member, and each of the first portion, the second portion, and the third portion may include polyimide (PI).

In an embodiment, the display module may further include a cushion (e.g., a cushion member) that contacts a portion of the second sensor.

In an embodiment of the present disclosure, a display device includes a display module configured to display an image and a set member configured to accommodate the display module.

The display module includes a base member, a circuit layer, a light emitting element layer, an encapsulation layer, a first sensor, and a second sensor.

The base member includes a first portion, a second portion extending from the first portion, and a third portion extending from the second portion.

The circuit layer is disposed on the first portion of the base member, and includes a plurality of transistors.

The light emitting element layer is disposed on the circuit layer, and includes a plurality of light emitting elements electrically connected to the plurality of transistors.

The encapsulation layer seals the light emitting element layer.

The first sensor is disposed on the encapsulation layer.

The second sensor is disposed on the third portion of the base member to detect a pressure applied from the outside.

When the second portion of the base member is bent, the second sensor overlaps the first portion of the base member.

In an embodiment, the display module may further include a plurality of pads, a printed circuit board, and an input sensing driving circuit.

The plurality of pads may include a plurality of first pads configured to transmit an electrical signal to the plurality of transistors, a plurality of second pads electrically connected to the first sensor, and a plurality of third pads electrically connected to the second sensor, and overlap the third portion of the base member.

The printed circuit board may be electrically connected to the plurality of pads.

The input sensing driving circuit may be mounted to the printed circuit board, and electrically connected to the plurality of second pads and the plurality of third pads.

In an embodiment, the set member may include: a bottom part including a protruding portion overlapping the second sensor; and a side part extending from a side of the bottom part.

In an embodiment, the display device may further include a cushion (e.g., a cushion member) disposed between the protruding portion of the bottom part and the second sensor.

In an embodiment, the second sensor may include: a first sensor part overlapping the protruding portion and disposed adjacent to a surface of the base member; and a second sensor part overlapping the protruding portion and disposed adjacent to a surface of the protruding portion.

In an embodiment of the present disclosure, the display device may further include a cushion (e.g., a cushion member) disposed between the first sensor part and the second sensor part.

In an embodiment, the display module may further include a data driving circuit disposed between the plurality of pads and the second sensor, and the data driving circuit may be electrically connected to the plurality of first pads.

In an embodiment, the second sensor may include a plurality of electrodes, and when a pressure is applied from the outside, a capacitance provided by the plurality of electrodes may be varied.

In an embodiment, the second sensor may include a strain gauge.

In an embodiment, the image may include a home button image at a fixed position of the display device (e.g., the home button is displayed always at the fixed position), and the second sensor may overlap the home button image.

In an embodiment of the present disclosure, a display module includes a base member, a blocking layer, a circuit layer, and a light emitting element layer.

The base member includes a first portion, a second portion extending from the first portion, and a third portion extending from the second portion.

The blocking layer includes a plurality of metal patterns disposed on the base member.

The circuit layer is disposed on the blocking layer and includes a plurality of transistors overlapping the first portion of the base member, and the plurality of transistors includes a plurality of activation members.

The light emitting element layer is disposed on the circuit layer, and includes a plurality of light emitting elements electrically connected to the plurality of transistors.

The plurality of metal patterns of the blocking layer include: a first metal pattern overlapping the plurality of activation members; a second metal pattern overlapping the first portion of the base member; and a third metal pattern overlapping the third portion of the base member and electrically connected to the second metal pattern.

In an embodiment, the display module may further include a printed circuit board electrically connected to the third metal pattern; and an input sensing driving circuit may be mounted to the printed circuit board and electrically connected to the third metal pattern.

In an embodiment, the input sensing driving circuit may detect variation of a capacitance of the second metal pattern or variation of a resistance value of the second metal pattern.

BRIEF DESCRIPTION OF THE FIGURES

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings:

FIGS. 5A and 5B are cross-sectional views illustrating a display module according to an embodiment of the present disclosure;

DETAILED DESCRIPTION

Hereinafter, embodiments of the present disclosure will be described with reference to the accompanying drawings.

Also, in the figures, the thickness, ratio, and dimensions of components are exaggerated for clarity of illustration. The term "and/or" includes any and all combinations of one or more of the associated listed items.

The terms "include" or "comprise" specifies a property, a fixed number, a step, an operation, an element, a component, or a combination thereof, but does not exclude other properties, fixed numbers, steps, operations, elements, components, or combinations thereof.

Figure 1A:
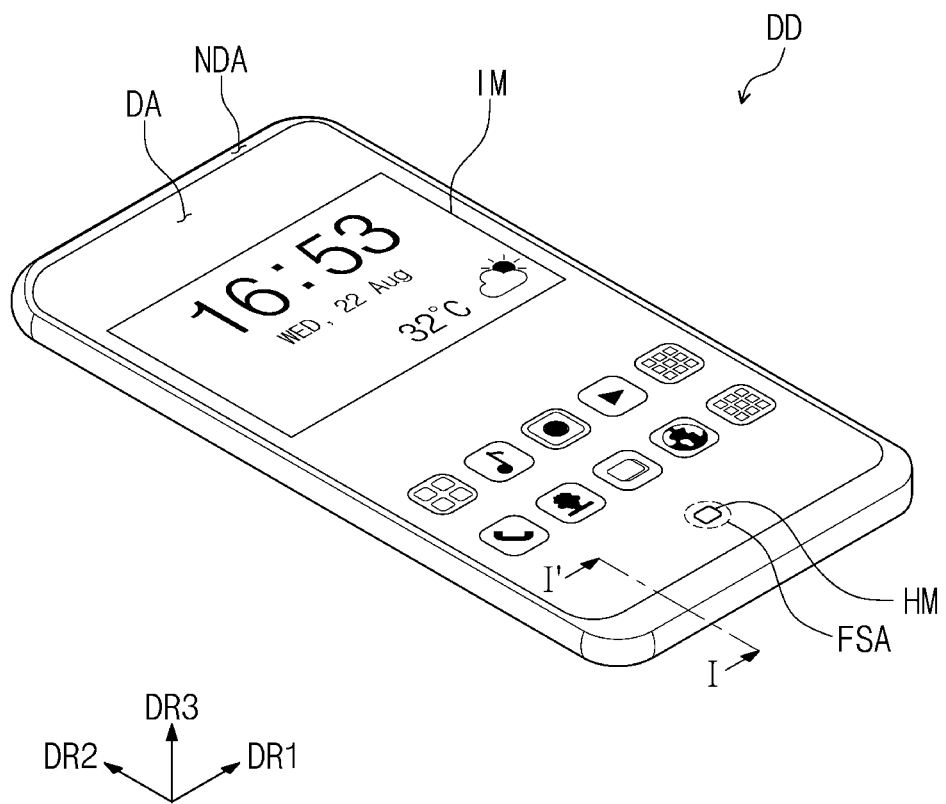
FIG. 1A is a perspective view illustrating a display device according to an embodiment of the present disclosure.
Figure 1B:
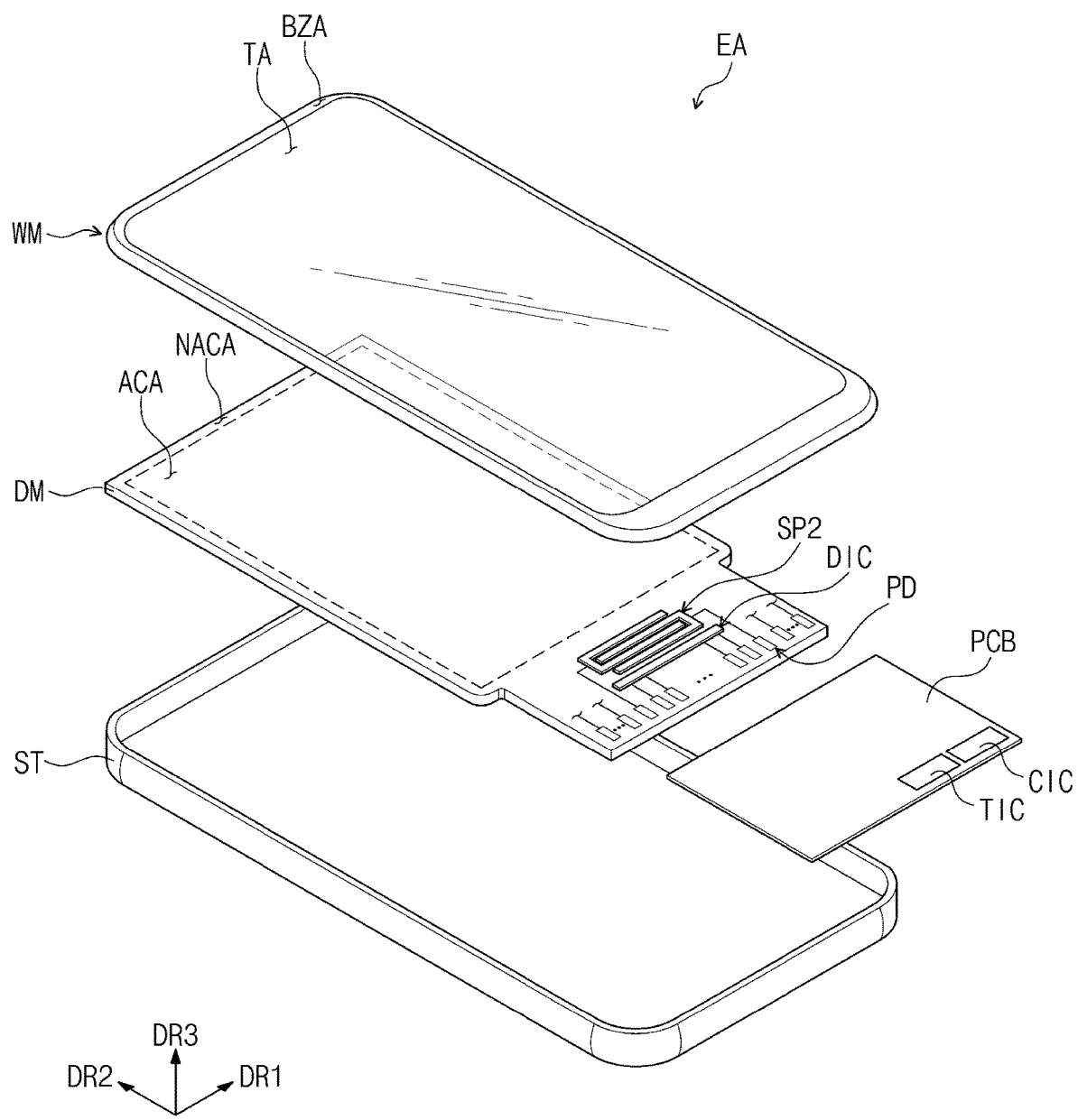
FIG. 1B is an exploded perspective view illustrating the display device according to an embodiment of the present disclosure.

FIG. 1A is a perspective view illustrating a display device DD according to an embodiment of the present disclosure. FIG. 1B is an exploded perspective view illustrating the display device DD according to an embodiment of the present disclosure.

In FIG. 1A, a smartphone is illustrated as an example of the display device DD. However, the embodiment of the present disclosure is not limited thereto. For example, the display device DD may be in or be part of a large-sized electronic device (such as a television or monitor) or a small and/or medium-sized electronic device (such as a mobile phone, tablet PC, navigation unit for a vehicle, game console, or smartwatch).

On the display device DD, a display area DA and a non-display area NDA may be defined. The display area DA may include a pressure sensing area FSA.

The display area DA may display an image IM and detect a user's touch. Also, the pressure sensing area FSA may detect a pressure applied from the outside. A home button image HM may be displayed in the input sensing area FSA. As a process of operating the display device DD, the home button image HM may be always displayed at a set or predetermined position of the display device DD. The user may then determine which area of the display area DA is the pressure sensing area FSA through the home button image HM.

The display area DA may be parallel to a plane defined by a first directional axis DR1 and a second directional axis DR2.

A normal direction of the display area DA, i.e., a thickness direction of the display device DD, indicates a third directional axis DR3. A front surface (or top surface) and a rear surface (or bottom surface) of each of the described members is distinguished by the third directional axis DR3. However, directions indicated by the first to third directional axes DR1, DR2, and DR3 may be a relative concept, and thus may be converted with respect to each other. Hereinafter, the first to third directions may be indicated by the first to third directional axes DR1, DR2, and DR3 and designated by the same reference numerals, respectively.

Although a shape of the display area is illustrated in FIG. 1A, the shape of the display area DA may be suitably varied as necessary.

The non-display area NDA is adjacent to the display area DA, and the image IM is not displayed on the non-display area NDA. The non-display area NDA may define a bezel area of the display device DD.

The non-display area NDA may surround or be around the display area DA. However, the embodiment of the present disclosure is not limited thereto. For example, the display area DA and the non-display area NDA may be suitably varied in shape (e.g., based on its design).

Referring to FIG. 1B, the display device DD may include a window member WM, a display module DM, and a set member ST.

On the window member WM, a transmission area TA and a bezel area BZA may be defined.

The transmission area TA may transmit incident light. Particularly, the image IM generated by the display module DM may be transmitted through the transmission area TA and seen by the user. The transmission area TA may overlap the display area DA.

The bezel area BZA may be adjacent to the transmission area TA. Particularly, the bezel area BZA may surround or be around the transmission area TA. In an embodiment of the present disclosure, the bezel area BZA may have a set or predetermined color. The bezel area BZA may overlap the non-display area NDA.

The display module DM may be disposed below the window member WM. The display module DM may be protected against an external impact or the like by the window member WM.

On the display module DM, an active area ACA and a non-active area NACA may be defined.

The active area ACA may correspond to the display area DA in FIG. 1A. The active area ACA may display the image IM, detect a user's touch, and detect a pressure applied from the outside. The pressure sensing area FSA in FIG. 1A may also be defined by a portion of the active area ACA of the display module DM.

The non-active area NACA may correspond to the non-display area NDA. Lines, for providing an electrical signal to the active area ACA and/or receiving an electrical signal from the active area ACA, may be disposed (located) in the non-active area NACA.

The set member ST may have at least a portion disposed below the display module DM. The set member ST may accommodate the window member WM and the display module DM.

Figure 2:
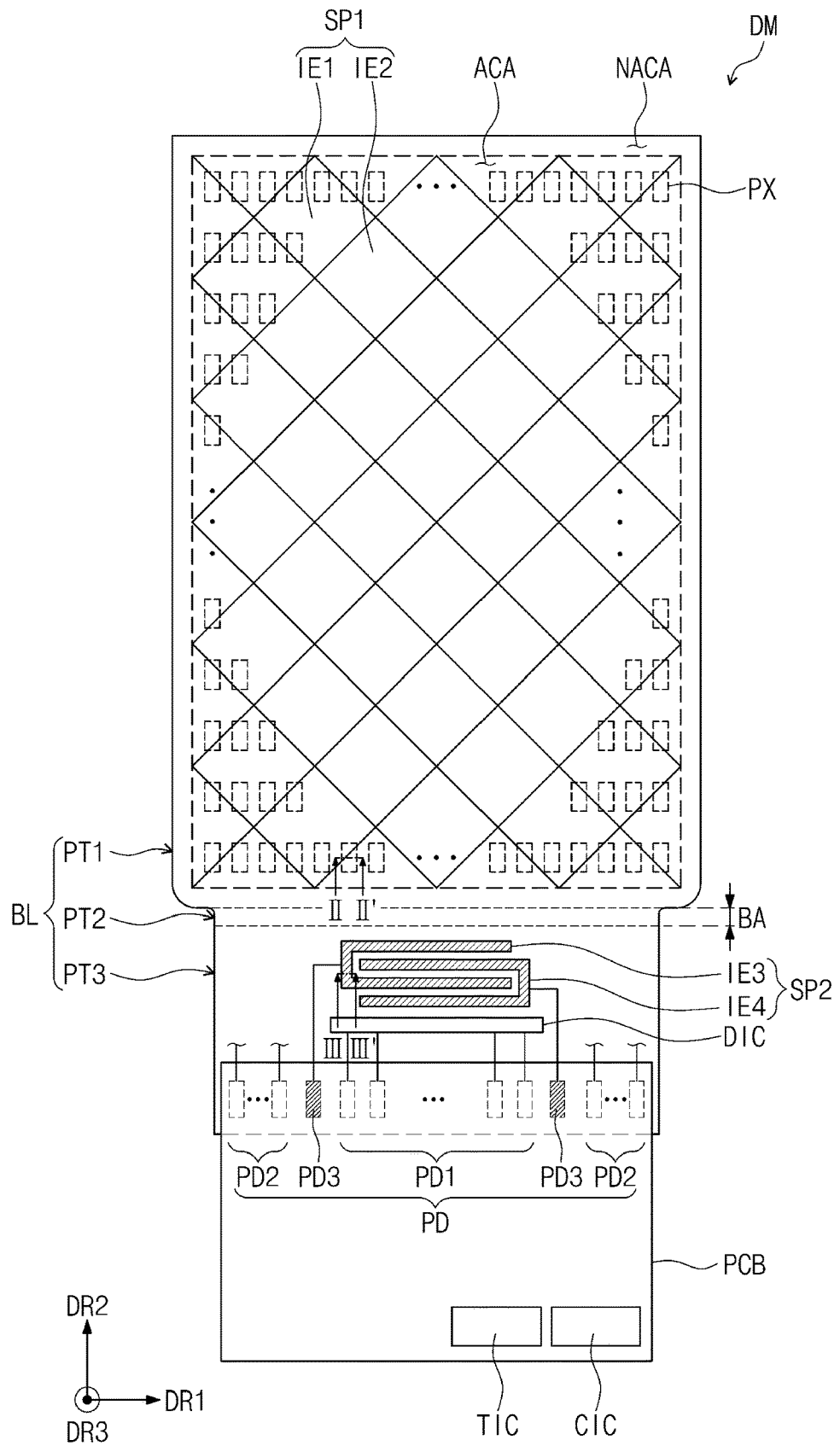
FIG. 2 is a plan view illustrating a display module according to an embodiment of the present disclosure.
Figure 3:
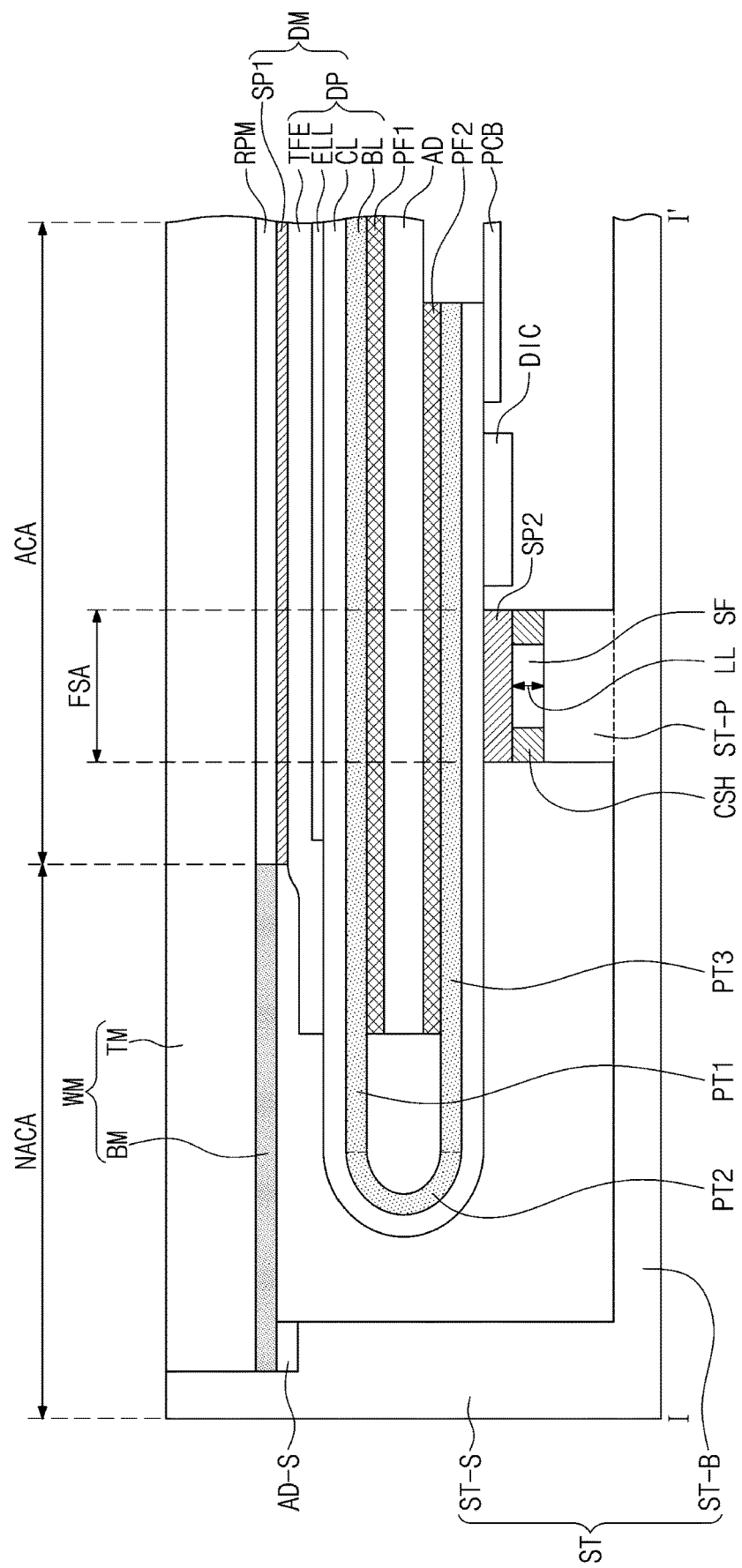
FIG. 3 is a view illustrating a cross-section taken along line I-I' in FIG. 1A.

FIG. 2 is a plan view illustrating the display module DM according to an embodiment of the present disclosure. FIG. 3 is a view illustrating a cross-section taken along line I-I' in FIG. 1A.

The display module DM may include a display panel DP, a first sensor SP1, a second sensor SP2, a data driving circuit DIC, a plurality of pads PD, a printed circuit board PCB, an input sensing driving circuit TIC, and a control driving circuit CIC.

The display panel may include a base member BL, a circuit layer CL, a light emitting element layer ELL, and an encapsulation layer TFE. In an embodiment of the present disclosure, the display panel DP may further include a blocking layer CPL and BRL (refer to FIG. 5A) disposed between the base member BL and the circuit layer CL.

The base member BL may include a first portion PT1, a second portion PT2 extending from the first portion PT1, and a third portion PT3 extending from the second portion PT2. In an embodiment of the present disclosure, the first portion PT1, the second portion PT2, and the third portion PT3 may be integrated with each other to provide the base member BL.

The second portion PT2 of the base member BL may have at least a portion that is defined as a bending area BA.

The second portion PT2 of the base member BL may have a length measured in the second direction DR2, which may be suitably varied as necessary. As the length of the second portion PT2 of the base member BL, which is measured in the second direction DR2, is varied, when a portion (e.g., bending area) of the second portion PT2 is bent, the second sensor SP2 may be adjusted to overlap with a certain portion of the active area ACA (e.g., overlap in a plan view or in the thickness or third direction).

Although the base member BL may include polyimide (PI), the embodiment of the present disclosure is not limited thereto.

Figure 4:
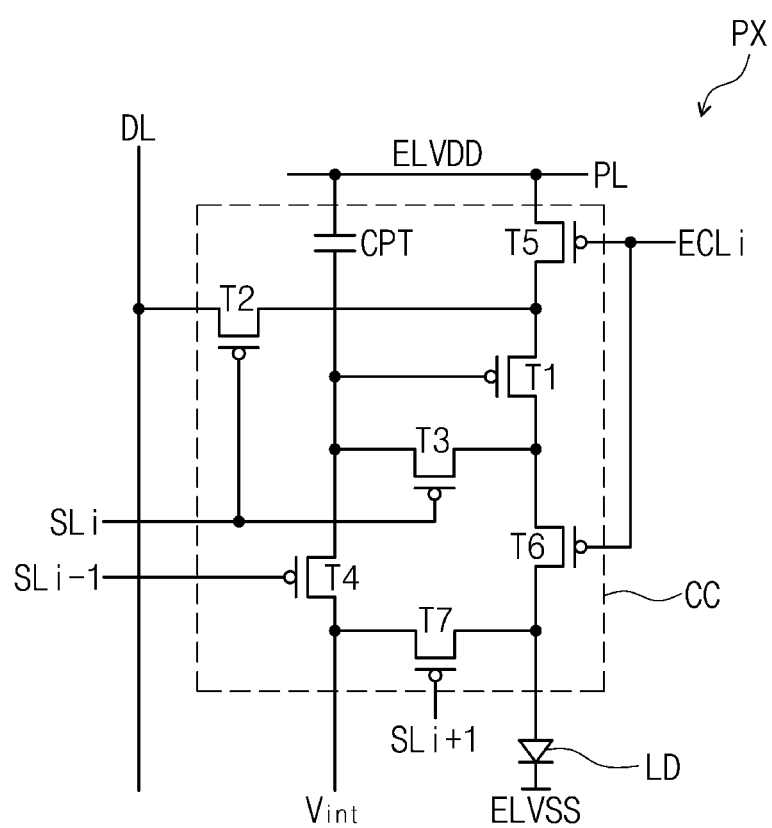
FIG. 4 is an equivalent circuit diagram illustrating a pixel according to an embodiment of the present disclosure.

The circuit layer CL may be disposed on the first portion PT1 of the base member BL and include a plurality of transistors T1 to T7 (refer to FIG. 4) and a capacitor CPT (refer to FIG. 4).

The light emitting element layer ELL may be disposed on the circuit layer CL and overlap the first portion PT1 of the base member BL. The light emitting element layer ELL may include a plurality of light emitting elements LD (refer to FIG. 4) that are electrically connected to the plurality of transistors T1 to T7 (refer to FIG. 7).

The encapsulation layer TFE may be disposed on the light emitting element layer ELL to seal the light emitting element layer ELL.

The first sensor SP1 may be disposed on the encapsulation layer TFE and overlap the first portion PT1 of the base member BL. The first sensor SP1 may be provided to detect a user's touch. In FIG. 3, it is illustrated that the first sensor SP1 is disposed on the circuit layer CL. However, the embodiment of the present disclosure is not limited thereto. For example, the first sensor SP1 may be disposed on the base member BL to constitute a portion of the circuit layer CL, or disposed on the encapsulation layer TFE as a portion of the encapsulation layer TFE extends.

The first sensor SP1 may include a plurality of first sensor parts IE1 and a plurality of second sensor parts IE2. Each of the first sensor part IE1 and the second sensor part IE2 may include an electrode containing metal.

The first sensor part IE1 and the second sensor part IE2 may provide a capacitance. When the user touches the active area ACA, the capacitance between the first sensor part IE1 and the second sensor part IE2 may be varied. The input sensing driving circuit TIC may detect variation of the first sensor SP1 to determine which point of the active area ACA is touched by the user.

The second sensor SP2 may overlap the third portion PT3 of the base member BL. Particularly, in a state before the second portion PT2 of the base member BL is bent, the second sensor SP2 may be disposed on the third portion PT3 of the base member BL.

In an embodiment of the present disclosure, the second sensor SP2 may be provided in the same process as the first sensor SP1. Thus, a metal material contained in the first sensor SP1 may be the same as that contained in the second sensor SP2.

In an embodiment of the present disclosure, the second sensor SP2 may include a third sensor part IE3 and a fourth sensor part IE4. Each of the third sensor part IE3 and the fourth sensor part IE4 may include an electrode containing metal.

In an embodiment of the present disclosure, the third sensor part IE3 and the fourth sensor part IE4 may provide a capacitance. When a pressure is applied from the outside, the capacitance between the third sensor part IE3 and the fourth sensor part IE4 may be varied. The input sensing driving circuit TIC may determine whether a pressure is applied from the outside by detecting variation of a capacitance of the second sensor SP2.

In an embodiment of the present disclosure, when a pressure is not applied from the outside, a capacitance provided by the second sensor SP2 and another component may be varied. The input sensing driving circuit TIC may determine whether a pressure is applied from the outside by detecting variation of the capacitance between the second sensor SP2 and another component.

In a state when the display module DM is not bent, a spaced distance between the second sensor SP2 and the active area ACA may be adjusted as necessary. As the spaced distance between the second sensor SP2 and the active area ACA is varied, when the display module DM is bent, the sensor SP2 may be adjusted to be sensor-coupled to or contact a certain (which) portion of the active area ACA.

In an embodiment of the present disclosure, the data driving circuit DIC may overlap the third portion PT3 of the base member BL. In the plan view defined by the first direction DR1 and the second direction DR2, the data driving circuit DIC may be disposed between the second sensor SP2 and the pads PD.

The data driving circuit DIC may be electrically connected to the pixels PX of the active area ACA and provide a data signal to the pixels PX.

The pads PD may include a plurality of first pads PD1, a plurality of second pads PD2, and a plurality of third pads PD3.

The first pads PD1 may transmit an electrical signal to the pixels PX through the data driving circuit DIC. In an embodiment of the present disclosure, the first pads PD1 may be electrically connected to at least one of the transistors T1 to T7 (refer to FIG. 4) of the pixels PX.

The second pads PD2 may be electrically connected to the first sensor SP1. Each of the second pads PD2 may be electrically connected to one of the first electrodes 1E1 and the second electrodes 1E2.

The third pads PD3 may be electrically connected to the second sensor SP2. Although one of the third pads PD3 is electrically connected to the third sensor part 1E3, and the other is electrically connected to the fourth sensor part IE4 in FIG. 2, the embodiment of the present disclosure is not limited thereto. In another embodiment of the present disclosure, as the number of electrodes contained in the second sensor SP2 increases, the number of the third pads PD3 may also increase in correspondence thereto.

The printed circuit board PCB may be electrically connected to the pads PD. The input sensing driving circuit TIC and the control driving circuit CIC may be mounted to the printed circuit board PCB.

The input sensing driving circuit TIC may detect variation of the capacitance of the first sensor SP1 by using the second pads PD2, and detect variation of the capacitance of the second sensor SP2 by using the third pads PD3. Thus, the input sensing driving circuit TIC may detect a user's touch applied to the active area ACA and a pressure applied from the outside.

The control driving circuit CIC may control at least one of the data driving circuit DIC and the input sensing driving circuit TIC.

As a portion corresponding to the second portion PT2 (or bending area) of the base member BL of the display module DM is bent, the second sensor SP2 may be disposed to overlap the active area ACA. An area of the active area ACA, which overlaps the second sensor SP2, may be defined as the pressure sensing area FSA.

An anti-reflection member RFP may be disposed between the display module DM and the window member WM. In an embodiment of the present disclosure, the anti-reflection member RFP may be a polarizing film or a polarizing plate.

The window member WM may include a transparent member TM and a black matrix BM. The transparent member TM may include a transparent material. For example, the transparent member TM may include glass or a synthetic resin.

The black matrix BM having a set or predetermined color may be disposed on a bottom surface of the transparent member TM. The bezel area BZA of the window member WM may be defined by the black matrix BM.

The set member ST may include a bottom part ST-B and a side part ST-S. The side part ST-S may extend from a side of the bottom part ST-B toward the window member WM. The side part ST-S and the window member WM may be coupled by a side adhesive AD-S.

In an embodiment of the present disclosure, the bottom part ST-B may include a protruding portion ST-P protruding toward the display module DM. A cushion (e.g., a cushion member) CSH may be disposed between a top surface SF of the protruding portion ST-P and the second sensor SP2. In an embodiment of the present disclosure, at least one portion of the top surface SF and at least one portion of the second sensor SP2 may not overlap the cushion CSH.

When a pressure is applied to the pressure sensing area FSA, a spaced distance LL between the top surface SF of the protruding portion ST-P and the second sensor SP2 may be varied. Thus, the capacitance formed between the third sensor part 1E3 and the fourth sensor part 1E4 of the second sensor SP2 may be varied. Alternatively, the capacitance formed between the top surface SF of the protruding portion ST-P and each of the third sensor part 1E3 and the fourth sensor part 1E4 of the second sensor SP2 may be varied.

Figure 5A:
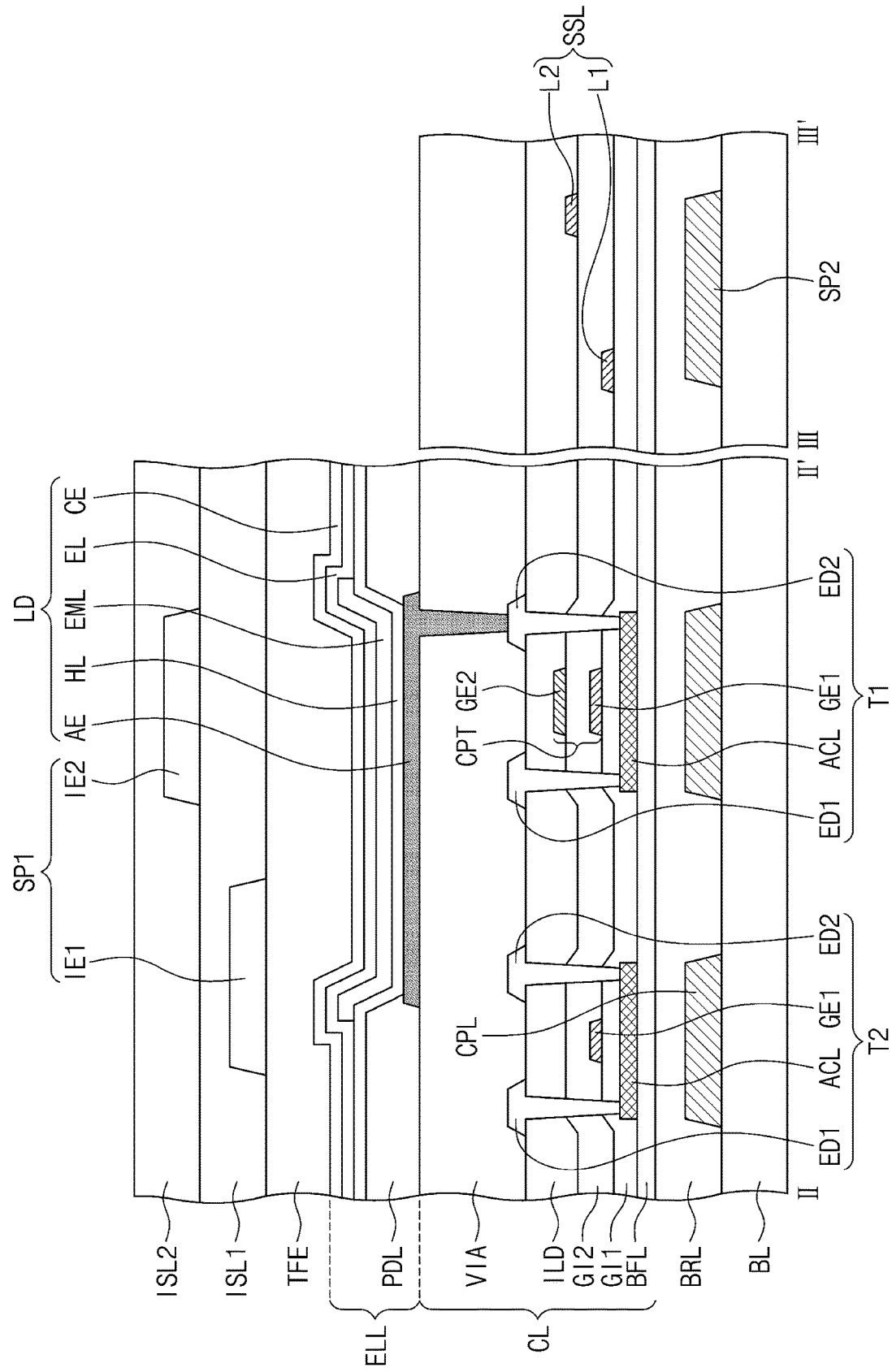

FIG. 4 is an equivalent circuit diagram illustrating the pixel PX according to an embodiment of the present disclosure. FIGS. 5A and 5B are cross-sectional views illustrating a display module according to an embodiment of the present disclosure. In FIG. 5A, cross-sections taken along lines II-II' and III-III' in FIG. 2 are illustrated together for ease of description, and, in FIG. 5B, an area corresponding to FIG. 5A is illustrated.

The pixel PX may include a light emitting element LD and a pixel circuit CC. The pixel circuit CC may include a plurality of transistors T1 to T7 and a capacitor CPT. The pixel circuit CC controls an amount of a current flowing through the light emitting element LD in response to a data signal.

In an embodiment of the present disclosure, the pixel circuit CC may receive a data signal from the data line DL, a scan signal from the scan lines SLi-1, SLi, and SLi+1, a light emitting control signal from a light emitting signal control line ECLi, and a first power ELVDD from a power line PL. Also, the pixel circuit CC may receive a second power ELVSS and an initialization voltage Vint.

The light emitting element LD may emit light with set or predetermined luminance in response to an amount of a current provided from the pixel circuit CC. The light emitting element LD may be an organic light emitting element OLED or a micro-LED. Hereinafter, the light emitting element LD is described as the organic light emitting element OLED.

Although the equivalent circuit of the pixel PX is illustrated in FIG. 4, in another embodiment of present disclosure, the kind of signals applied to the transistors, the number of transistors, a connection relationship between transistors, or the number of capacitors may be varied.

Although PMOS is illustrated in FIG. 4, the embodiment of the present disclosure is not limited thereto. In another embodiment of the present disclosure, the pixel PX may include NMOS. In another embodiment of the present disclosure, the pixel PX may include a combination of NMOS and PMOS.

In each of FIGS. 5A and 5B, a cross-sectional view of a portion of the display area DA and a cross-sectional view of a portion of an area in which the second sensor SP2 is disposed are illustrated together. Although a first transistor T1 and a second transistor T2 are illustrated in FIG. 5A, the embodiment of the present disclosure is not limited to the structure of each of the first transistor T1 and the second transistor T2.

Each of the transistors T1 and T2 may include a first electrode ED1, a second electrode ED2, a first control electrode GE1, and an activation member ACL.

The second electrode ED2 of the first transistor T1 may not directly contact an anode electrode AE of the pixel PX, and the first transistor may pass through the sixth transistor T6 and be connected to the anode electrode AE of the pixel PX. However, the embodiment of the present disclosure is not limited thereto. For example, in another embodiment of the present disclosure, the second electrode ED2 of the first transistor T1 may directly contact the anode electrode AE of the pixel PX.

The display panel DP (refer to FIG. 3) may include a base member BL, a blocking layer CPL and BRL, a circuit layer CL, a light emitting layer ELL, and an encapsulation layer TFE.

The circuit layer CL may include a buffer layer BFL, gate insulation layers GI1 and GI2, an interlayer insulation layer ILD, a circuit insulation layer VIA, and transistors T1 and T2.

The light emitting element layer ELL may include a light emitting element LD and a pixel defining layer PDL.

The encapsulation layer TFE may seal the light emitting element layer ELL to protect the light emitting element layer ELL against external oxygen and/or moisture.

The blocking layer CPL and BRL may include a plurality of first metal patterns CPL and a cover layer BRL covering the first metal patterns CPL.

The first metal patterns CPL may be disposed on the base member BL. Electrodes of the first metal patterns CPL may overlap the activation members ACL, respectively.

The cover layer BRL may include an organic material or an inorganic material. In an embodiment of the present disclosure, the cover layer BRL may provide a planar surface.

The buffer layer BFL may be disposed on the cover layer BRL. In an embodiment of the present disclosure, the buffer layer BFL may protect or prevent foreign substances existing in the base member BL from being introduced to the pixel PX.

The activation members ACL of the transistors T1 and T2 are disposed on the buffer layer BFL. Each of the activation members ACL may include polysilicon or amorphous silicon. Besides, the activation member ACL may include a metal oxide semiconductor.

The activation members ACL may include a channel region serving as a passage through which electrons or holes may move, and a first ion doping region and a second ion doping region, which are disposed with the channel region therebetween.

A first gate insulation layer GI1 covering the activation members ACL is disposed on the buffer layer BFL. The first gate insulation layer GI1 includes an organic layer and/or an inorganic layer. The first gate insulation layer GI1 may include a plurality of inorganic thin-films. Each of the plurality of inorganic thin-films may include a silicon nitride layer and a silicon oxide layer.

First control electrodes GE1 of the transistors T1 and T2 are disposed on the first gate insulation layer GI1. The first control electrode GE1 of the first transistor T1 may be one of two electrodes of the capacitor CPT.

A second gate insulation layer GI2 covering the first control electrodes GE1 is disposed on the first gate insulation layer GI1. The second gate insulation layer GI2 includes an organic layer and/or an inorganic layer. The second gate insulation layer GI2 may include a plurality of inorganic thin-films. Each of the plurality of inorganic thin-films may include a silicon nitride layer and a silicon oxide layer.

The other electrode GE2 (hereinafter, referred to as a second control electrode) of the two electrodes of the capacitor CPT (refer to FIG. 4) may be disposed on the second gate insulation layer GI2. That is, the first control electrode GE1 disposed on the first gate insulation layer GI1 and the second control electrode GE2 disposed on the second gate insulation layer GI2 may overlap each other to provide (to form) the capacitor CPT in FIG. 4. However, the embodiment of the present disclosure is not limited to the arrangement structure of the electrodes of the capacitor CPT.

The second control electrode GE2 may overlap the first control electrode GE1 of the first transistor T1 in a plan view and may not overlap the second control electrode GE2 of the second transistor T2 in the plan view (in the thickness direction). The second control electrode GE2 overlaps the channel region of the activation member ACL of the first transistor T1. According to the embodiment, the capacitor CPT provided by the first control electrode GE1 and the second control electrode GE2 may overlap the first transistor T1 and be spaced apart from the second transistor T2. However, the embodiment of the present disclosure is not limited thereto. For example, the capacitor CPT may overlap the second transistor T2 or be provided in plurality to overlap the first transistor T1 and to overlap the second transistor T2, respectively.

The interlayer insulation layer ILD covering the second control electrode GE2 is disposed on the second gate insulation layer GI2. The interlayer insulation layer ILD includes an organic layer and/or an inorganic layer. The interlayer insulation layer ILD may include a plurality of inorganic thin-films. Each of the plurality of inorganic thin-films may include a silicon nitride layer and a silicon oxide layer.

The first electrode ED1 and the second electrode ED2 of each of the transistors T1 and T2 may be disposed on the interlayer insulation layer ILD.

The first electrode ED1 and the second electrode ED2 may be connected to corresponding activation members ACL, respectively, through contact holes passing through the gate insulation layers GI1 and GI2 and the interlayer insulation layer ILD.

The circuit insulation layer VIA covering the first electrodes ED1 and the second electrodes ED2 is disposed on the interlayer insulation layer ILD. The circuit insulation layer VIA includes an organic layer and/or an inorganic layer. The circuit insulation layer VIA may provide a planar surface.

The pixel defining layer PDL and the light emitting element LD are disposed on the circuit insulation layer VIA.

The light emitting element LD may include an anode electrode AE, a hole control layer HL, a light emitting layer ELL, an electron control layer EL, and a cathode electrode CE.

The encapsulation layer TFE is disposed on the light emitting element layer ELL to cover the light emitting element ED. The first sensor SP1 is disposed on the encapsulation layer TFE. In the embodiment, the first sensor part IE1 and the second sensor part IE2 are disposed in different layers from each other. Particularly, the first sensor part IE1 may be disposed between the encapsulation layer TFE and a first sensing insulation layer ISL1, and the second sensor part IE2 may be disposed between the first sensing insulation layer ISL1 and a second sensing insulation layer ISL2. However, the embodiment of the present disclosure is not limited thereto. For example, the first sensor part IE1 and the second sensor part IE2 may be disposed on the same layer or partially disposed on different layers to insulately cross each other (to cross and be insulated from each other) in the plan view.

As illustrated in FIG. 5A, the second sensor SP2 may be disposed on the same layer as the first metal pattern CPL. The second sensor SP2 (or a portion thereof) may overlap set or predetermined signal lines SSL. In FIG. 5A, the second sensor SP2 is illustrated by a portion of the third sensor part IE3. Although the third sensor part IE3 and the fourth sensor part IE4 are disposed on the same layer in the embodiment, the embodiment of the present disclosure is not limited thereto. For example, the third sensor part IE3 and the fourth sensor part IE4 may be disposed on different layers from each other.

The signal lines SSL may include a first line L1 and a second line L2, which are disposed on different layers from each other. The first line L1 is disposed between the gate insulation layers GI1 and GI2, and the second line L2 is disposed between the second gate insulation layer GI2 and the interlayer insulation layer ILD. However, the embodiment of the present disclosure is not limited thereto. For example, the signal lines SSL according to an embodiment of the present disclosure may include lines disposed on the same layer.

The signal lines SSL may include data fan-out lines connecting the pixels PX and the data driving circuit. The data fan-out lines may be provided such that a portion of data lines DL extends or the data lines DL contact the data lines DL disposed on another layer. In the embodiment, the signal lines SSL are disposed on the same layer as the first control electrode GE1. However, the embodiment of the present disclosure is not limited thereto. For example, the signal lines SSL may include lines connected to power lines PL providing a power voltage or lines connected to gate lines GL providing gate signals.

As the second sensor SP2 is disposed on the same layer as the first metal pattern CPL, the second sensor SP2 may overlap the signal lines SSL without being electrically short circuit with the signal lines SSL. Thus, because a previously existing (provided) area may be used to provide the second sensor SP2, a process (e.g., a manufacturing process) may be simplified, and processing costs may be reduced or saved.

Alternatively, as illustrated in FIG. 5B, a second sensor SP2a may be disposed on the same layer as a first sensor SP1. The second sensor SP2a is disposed on the encapsulation layer TFE. The second sensor SP2a is spaced apart from the first sensor SP1 in the plan view. In one or more embodiments, as the second sensor SP2a is spaced apart from the signal lines connecting the first sensor SP1 to the second pads PD2 in the plan view, an electrical short circuit between the first sensor SP1 and the second sensor SP2a may be prevented.

Figure 6A:
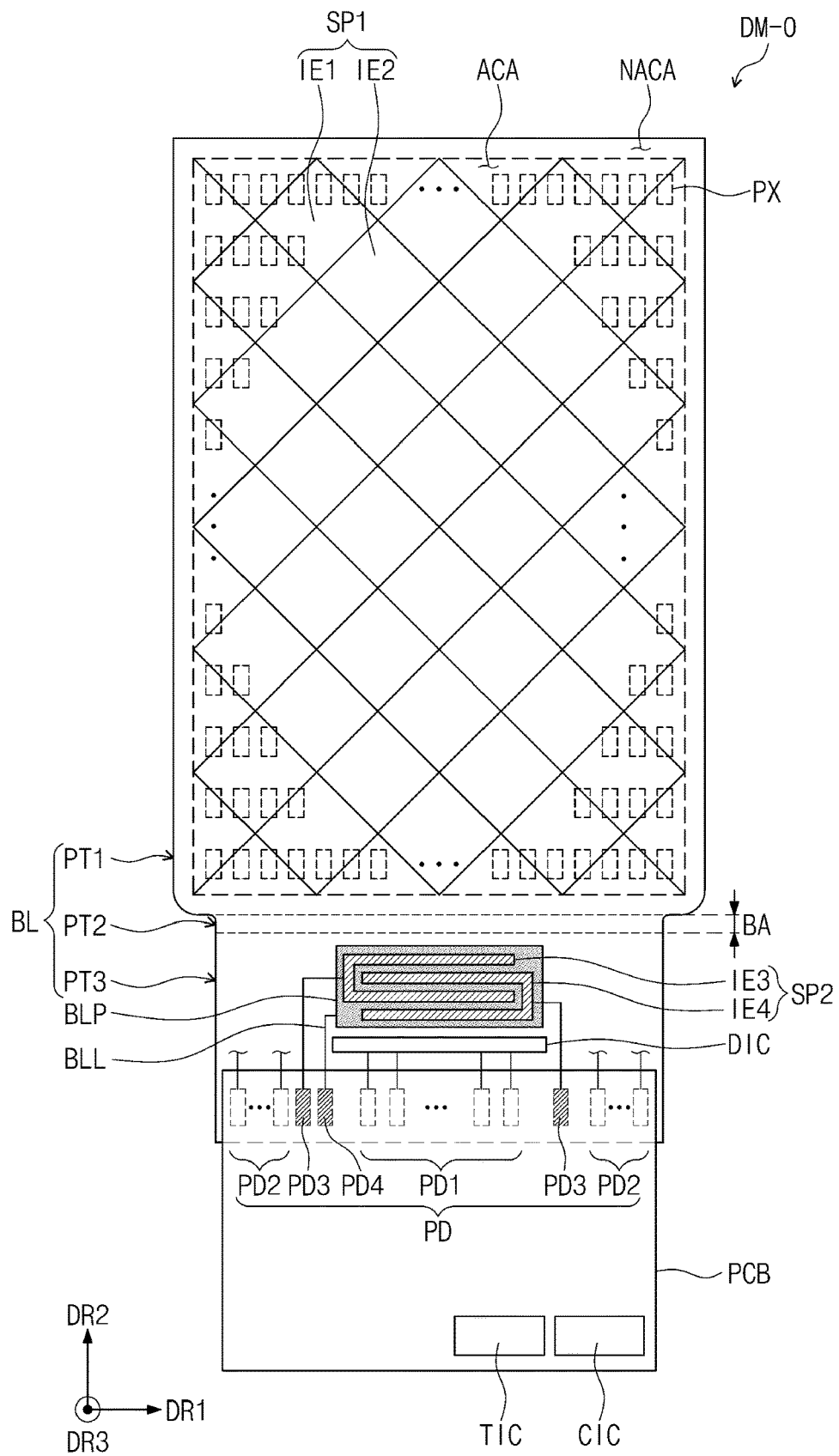
FIG. 6A is a plan view illustrating a display module according to an embodiment of the present disclosure.
Figure 6B:
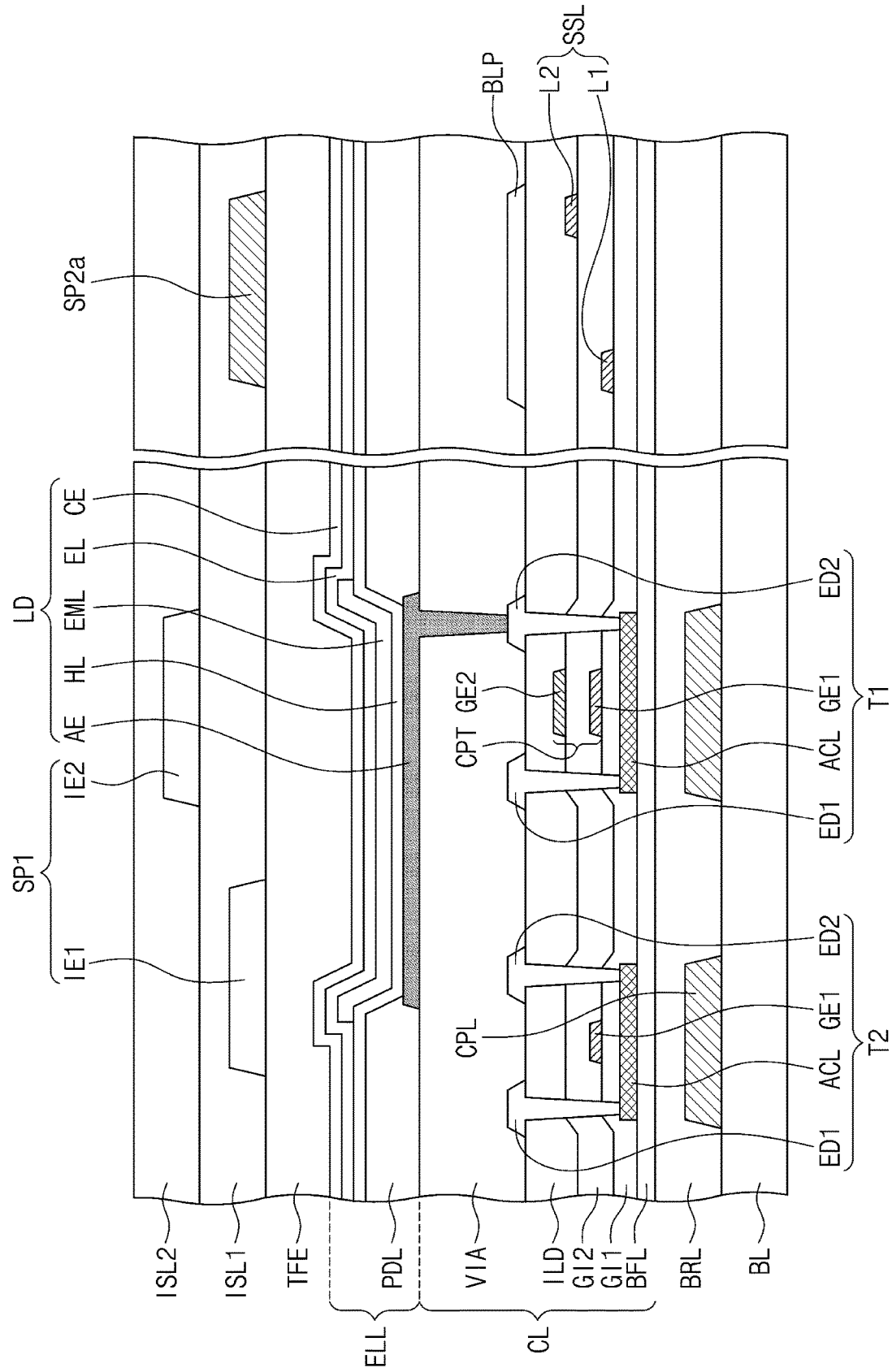
FIG. 6B is a cross-sectional view illustrating the display module according to an embodiment of the present disclosure.

FIG. 6A is a plan view illustrating a display module DM-0 according to an embodiment of the present disclosure. FIG. 6B is a cross-sectional view illustrating the display module according to an embodiment of the present disclosure.

As illustrated in FIGS. 6A and 6B, the display module DM-0 according to an embodiment of the present disclosure may further include a sealing pattern BLP. The sealing pattern BLP may overlap the second sensor SP2 in the plan view. The sealing pattern BLP may entirely overlap the second sensor SP2.

The sealing pattern BLP may have conductivity and include a conductive material. The sealing pattern BLP may be connected to a sealing conductive line BLL and receive an electrical signal from the outside through a terminal PD4. The sealing pattern BLP may receive a power voltage. For example, the sealing pattern BLP may receive a VSS voltage. However, the embodiment of the present disclosure is not limited thereto. For example, the sealing pattern BLP may receive various voltages as long as the sealing pattern BLP is a direct current power source.

The sealing pattern BLP may be disposed between the second sensor SP2 and the signal lines SSL on a cross-section. In the embodiment, the sealing pattern BLP is disposed on the same layer as input electrodes ED1 and output electrodes ED2 of the transistors T1 and T2. However, the embodiment of the present disclosure is not limited thereto. For example, the sealing pattern BLP may be disposed on various suitable layers as long as the sealing pattern BLP is disposed between the signal lines SSL and the second sensor SP2.

The sealing pattern BLP may prevent electrical interference between the second sensor SP2 and the signal lines SSL. As the sealing pattern BLP prevents a capacitance, such as a parasitic capacitance, between the second sensor SP2 and the signal lines SSL from being formed, the second sensor SP2 may stably detect an external input regardless of the signal lines SSL.

Figure 7:
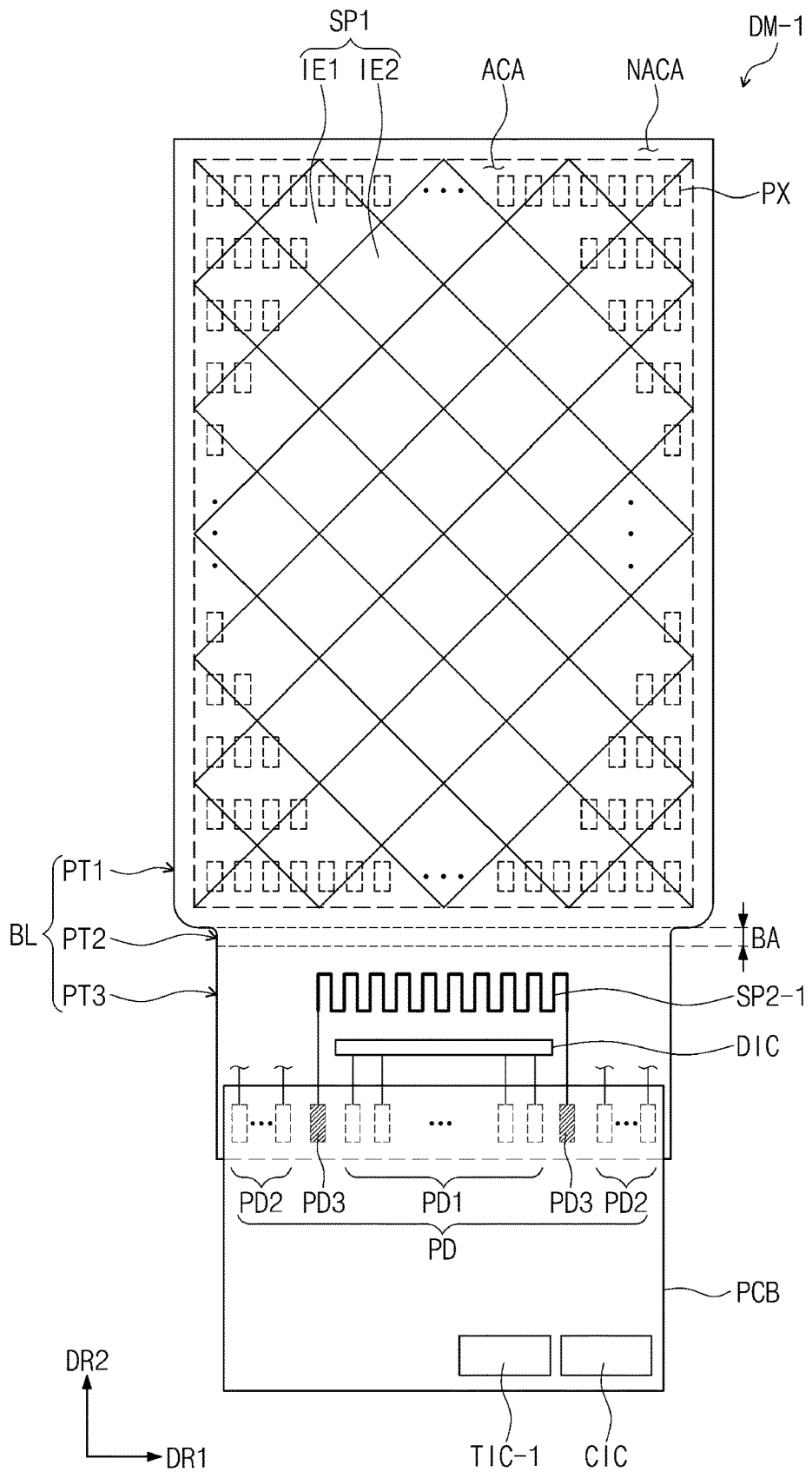
FIG. 7 is a plan view illustrating a display module according to an embodiment of the present disclosure.
Figure 8:
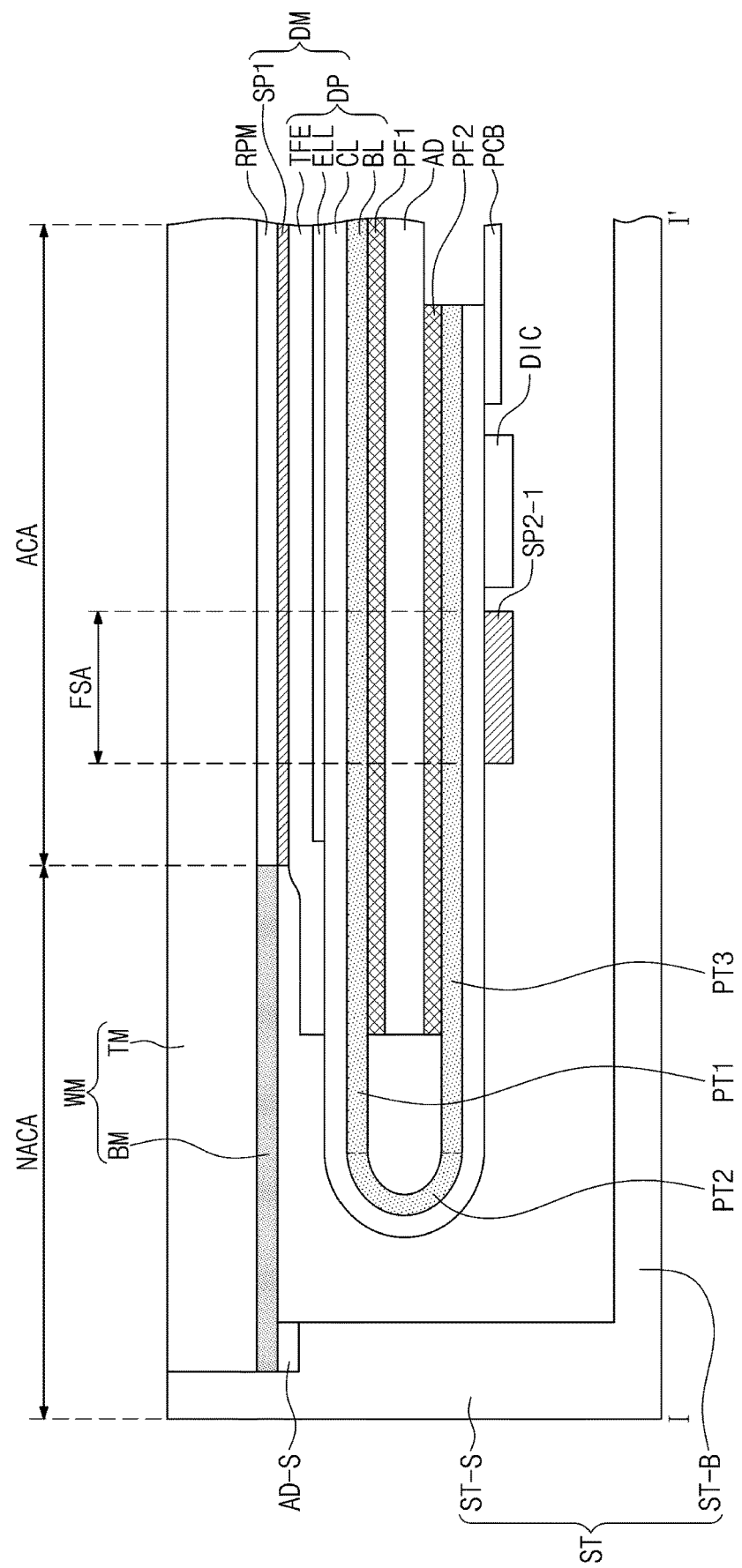
FIG. 8 is a view illustrating a portion of a cross-section taken along line I-I' in FIG. 1A.

FIG. 7 is a plan view illustrating a display module DM-1 according to an embodiment of the present disclosure. FIG. 8 is a view illustrating a portion of a cross-section taken along line I-I' in FIG. 1A.

A second sensor SP2-1 may overlap a third portion PT3 of a base member BL. In an embodiment of the present disclosure, the sensor SP2-1 may include a strain gauge.

When a pressure is applied to a pressure sensing area FSA from the outside, a resistance value of the second sensor SP2-1 may be varied. A pressure sensing driving circuit TIC-1 mounted on a printed circuit board PCB may detect a resistance variation value of the second sensor SP2-1 and determine whether a pressure is applied from the outside.

Because the variation of the resistance value of the second sensor SP2-1 is caused by that of a length of the sensor SP2-1, unlike as illustrated in FIG. 3, a bottom part ST-B in FIG. 8 may not include the protruding portion ST-P (refer to FIG. 3).

Besides, the description of other components in FIGS. 7 and 8 is substantially the same as that in FIGS. 2 to 5B, and thus is omitted.

Figure 9:
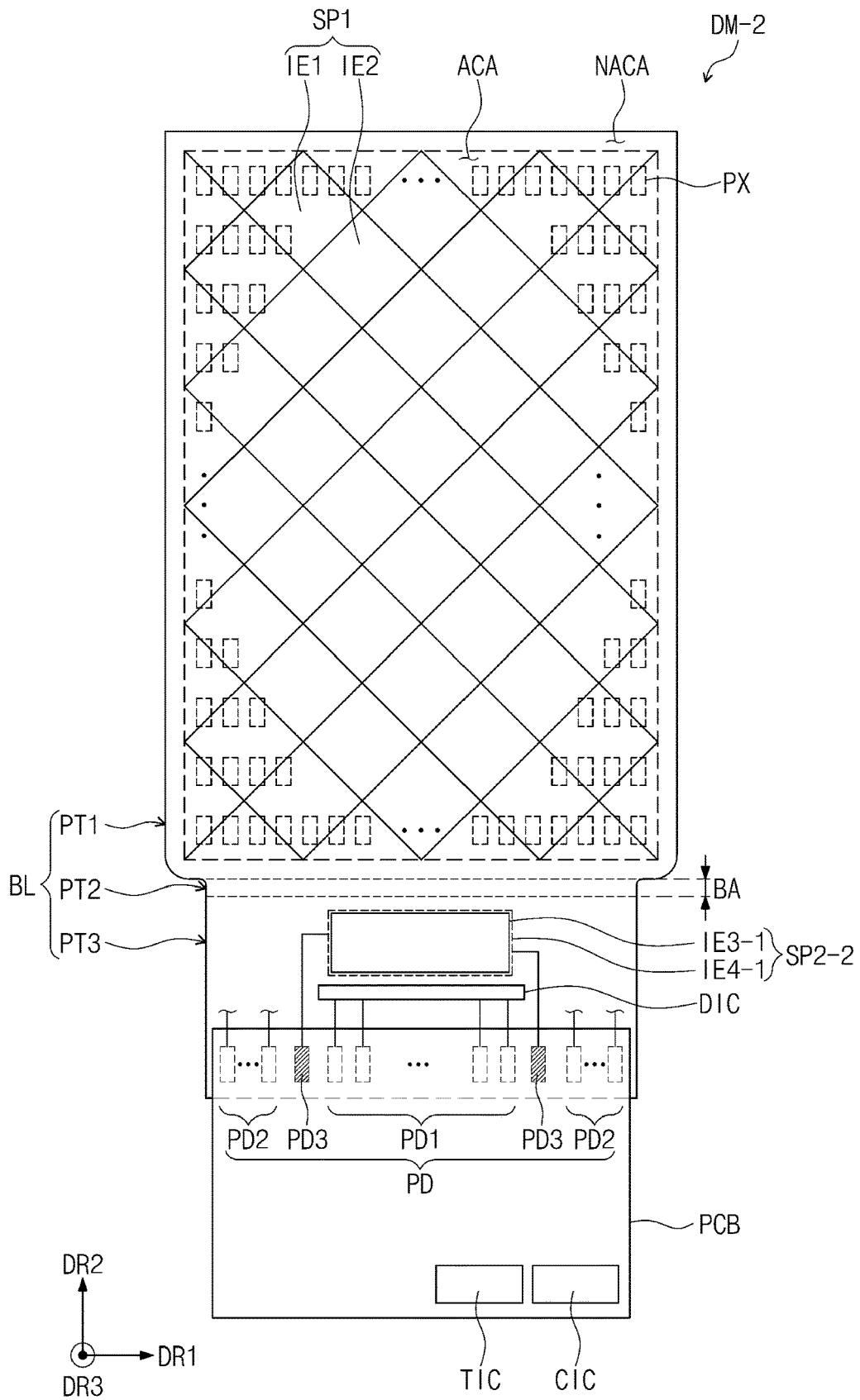
FIG. 9 is a plan view illustrating a display module according to an embodiment of the present disclosure.
Figure 10:
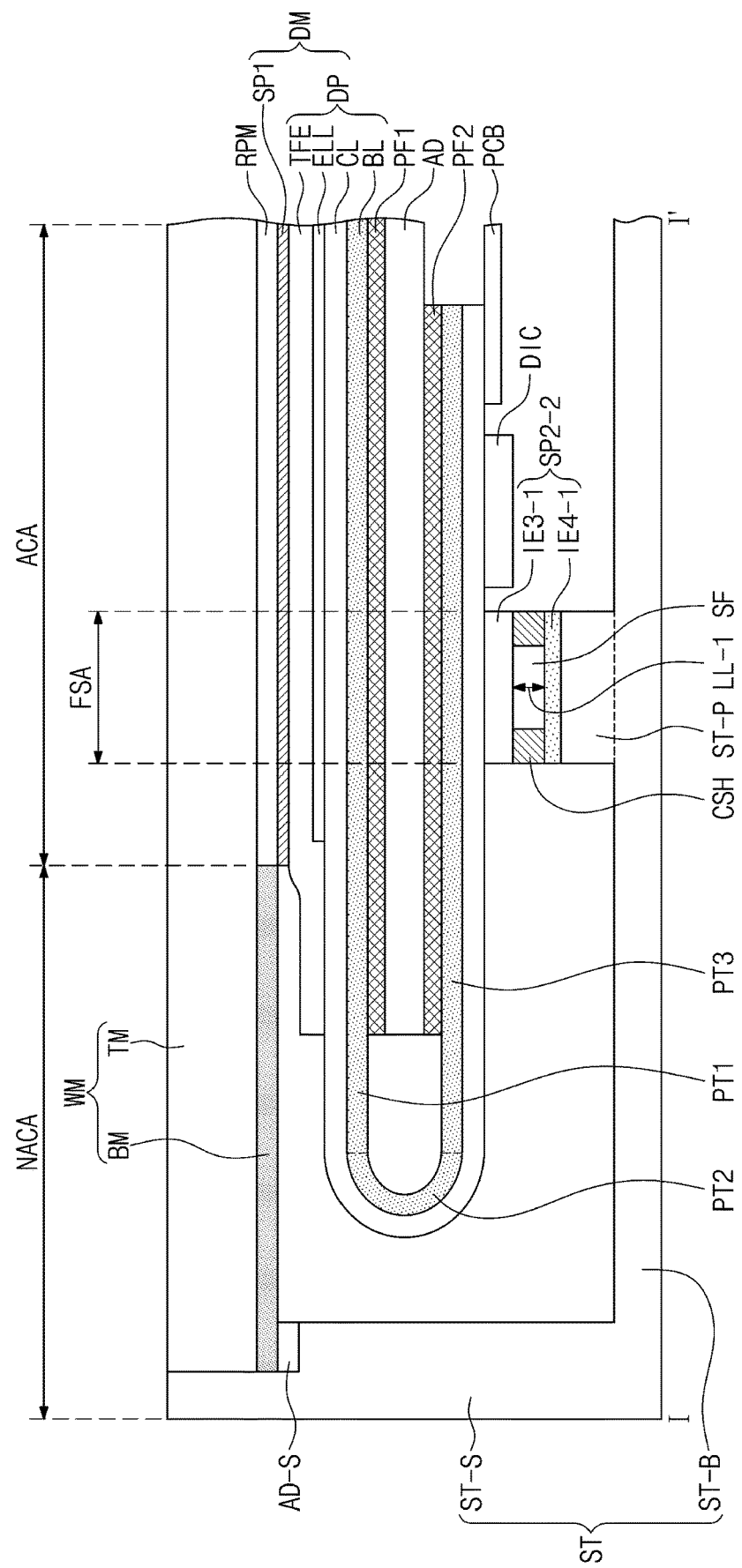
FIG. 10 is a view illustrating a portion of a cross-section taken along line I-I' in FIG. 1A.

FIG. 9 is a plan view illustrating a display module DM-2 according to an embodiment of the present disclosure. FIG. 10 is a view illustrating a portion of a cross-section taken along line I-I' in FIG. 1A.

A second sensor SP2-2 may overlap a third portion PT3 of a base member BL. In an embodiment of the present disclosure, the second sensor SP2-2 may include a third sensor part IE3-1 and a fourth sensor part IE4-1. The third sensor part IE3-1 and the fourth sensor part IE4-1 may overlap each other in the third direction DR3. The third sensor part IE3-1 and the fourth sensor part IE4-1 may overlap the protruding portion ST-P.

The third sensor part IE3-1 may be disposed adjacent to (relatively closer to) a surface of the base member BL, and the fourth sensor part IE4-1 may be disposed adjacent to (relatively closer to) a surface of the protruding portion ST-P.

The third sensor part IE3-1 may be electrically connected to one of third pads PD3, and the fourth sensor part IE4-1 may be electrically connected to the other of the third pads PD3.

When a pressure is applied to a pressure sensing area FSA from the outside, a spaced distance LL-1 between the third sensor part IE3-1 and the fourth sensor part IE4-1 may be varied. When the spaced distance LL-1 between the third sensor part IE3-1 and the fourth sensor part IE4-1 is varied, a capacitance provided between the third sensor part IE3-1 and the fourth sensor part IE4-1 may be varied. An input sensing driving circuit TIC mounted to a printed circuit board PCB may detect the above-described variation of the capacitance to determine whether a pressure is applied from the outside.

Figure 11:
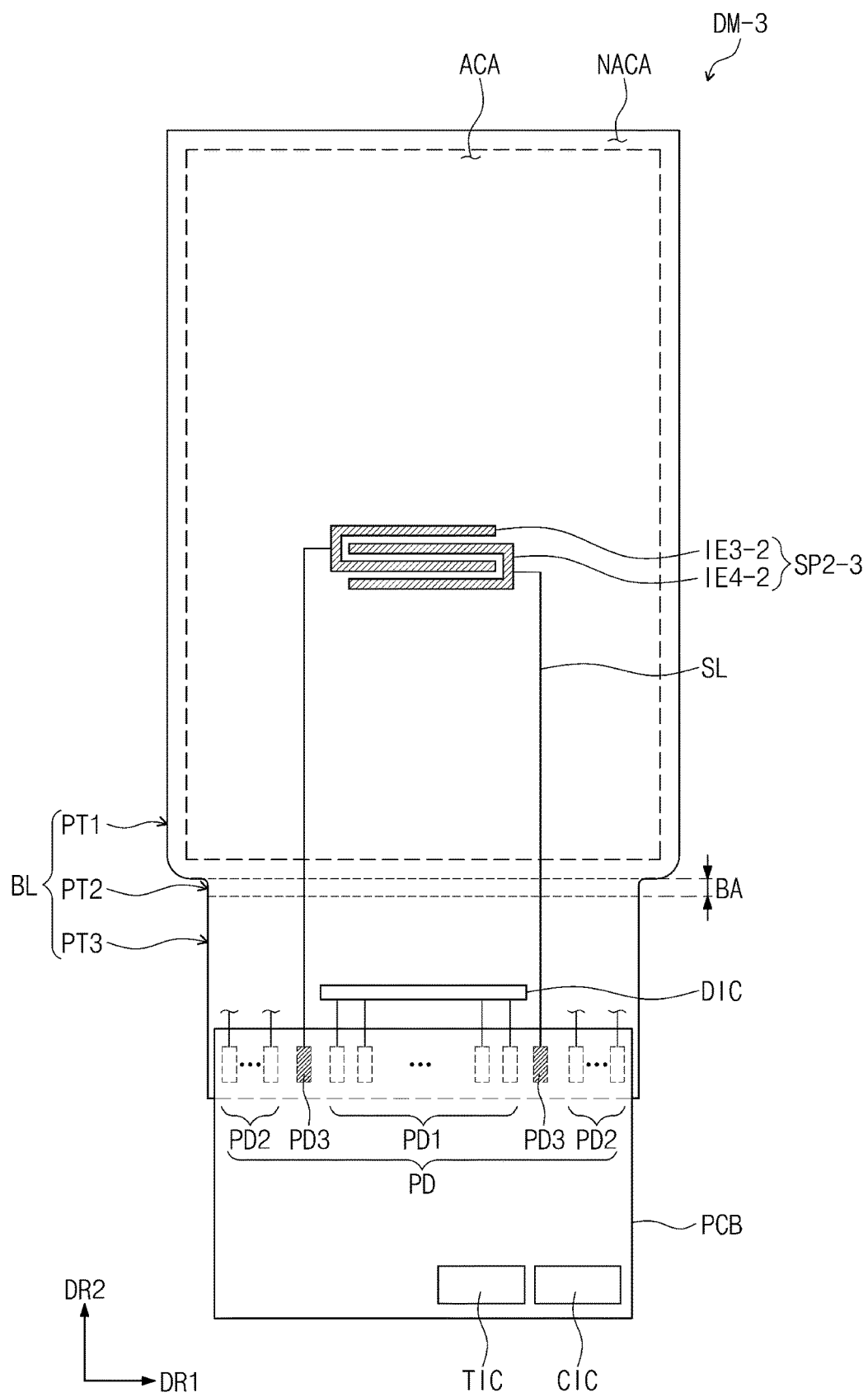
FIGS. 11 and 12 are plan views, each illustrating a display module according to an embodiment of the present disclosure.
Figure 12:
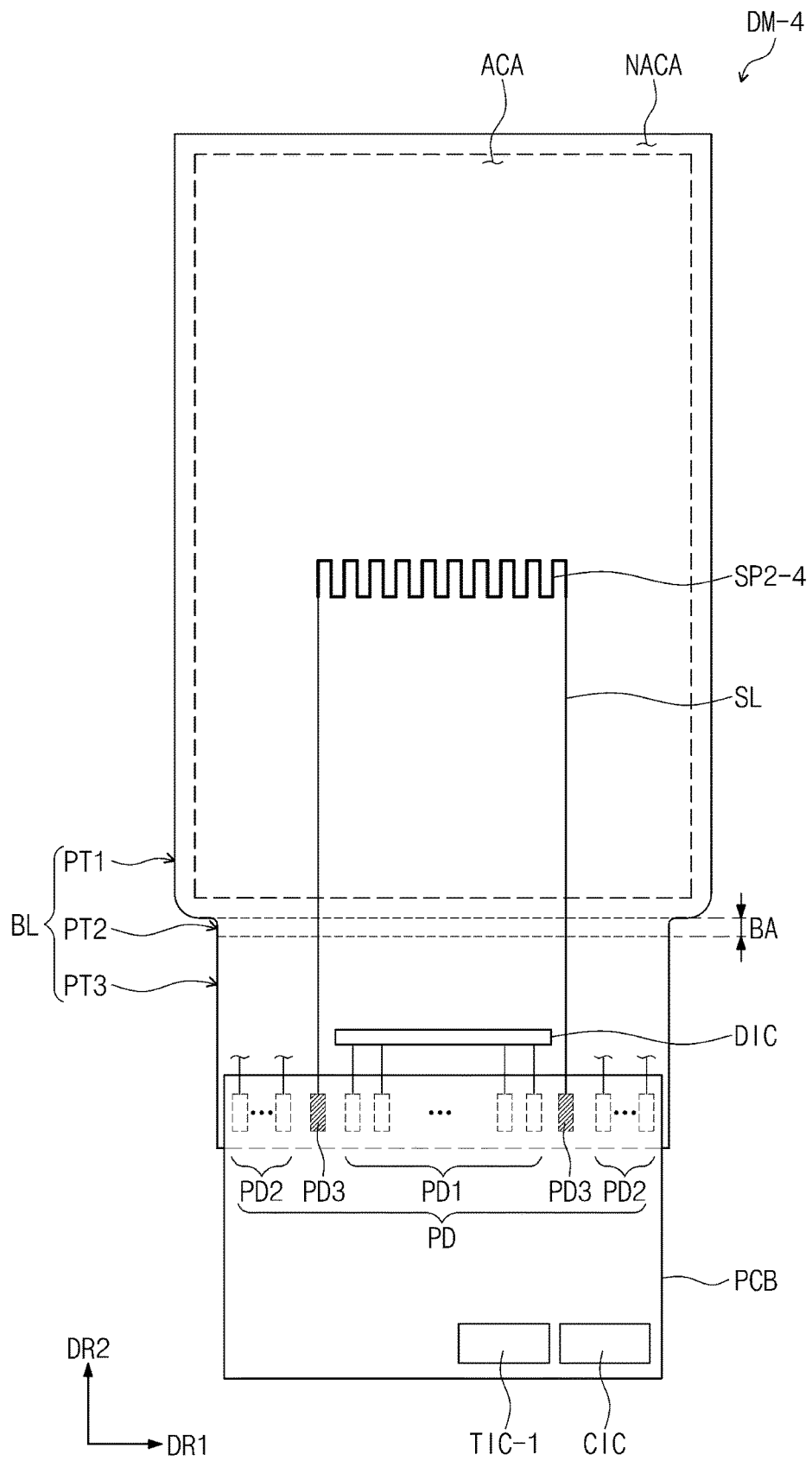

FIGS. 11 and 12 are plan views illustrating display modules DM-3 and DM-4 according to embodiments of the present disclosure.

Referring to FIG. 11, the display module DM-3 may include a second sensor SP2-3 disposed in an active area ACA.

The second sensor SP2-3 may include a third sensor part IE3-2 and a fourth sensor part IE4-2. The third sensor part IE3-2 and the fourth sensor part IE4-2 may be disposed adjacent to each other. In this specification, the third sensor part IE3-2 and the fourth sensor part IE4-2 of the second sensor SP2-3 may be referred to as a second metal pattern.

The third sensor part IE3-2 and the fourth sensor part IE4-2 may be electrically connected to third pads PD3 by signal lines SL. In this specification, the third pads PD3 may be referred to as a third metal pattern.

Referring to FIGS. 4 and 11, each of the third sensor part IE3-2 and the fourth sensor part IE4-2 may be disposed on the same layer as the first metal pattern CPL, and at least a portion of the signal lines SL may be disposed on the same layer as the first metal pattern CPL. That is, at least a portion of the third sensor part IE3-2, the fourth sensor part IE4-2, and the signal lines SL may be provided through the same process as the first metal pattern CPL.

When a pressure is applied to an area of the active area ACA, which overlaps the second sensor SP2-3, a capacitance provided between the third sensor part IE3-2 and the fourth sensor part IE4-2 may be varied. An input sensing driving circuit TIC mounted to a printed circuit board PCB may detect the above-described variation of the capacitance to determine whether a pressure is applied from the outside.

Referring to FIG. 12, the display module DM-3 may include a second sensor SP2-4 disposed in an active area ACA. The second sensor SP2-4 may include a strain gauge.

The second sensor SP2-4 may be electrically connected to third pads PD3 by signal lines SL.

Referring to FIGS. 4 and 12, the second sensor SP2-4 may be disposed on the same layer as the first metal pattern CPL, and at least a portion of the signal lines SL may be disposed on the same layer as the first metal pattern CPL. That is, at least a portion of the second sensor SP2-4 and the signal lines SL may be provided through the same process as the first metal pattern CPL.

When a pressure is applied to a pressure sensing area FSA, a resistance value of the second sensor SP2-4 may be varied. A pressure sensing driving circuit TIC-1 mounted on a printed circuit board PCB may detect a resistance variation value of the second sensor SP2-4 and determine whether a pressure is applied from the outside.

According to one or more embodiments of the present disclosure, the display module capable of detecting the user's touch and the pressure applied by the user and the display device including the same may be provided.

Although the example embodiments of the present invention have been described, it is understood that the present invention should not be limited to these example embodiments but various changes and modifications can be made by one of ordinary skill in the art within the spirit and scope of the present invention as hereinafter claimed. Thus, to the maximum extent allowed by law, the scope of the present invention is to be determined by the broadest permissible interpretation of the following claims and their equivalents, and shall not be restricted or limited by the foregoing detailed description.

What is claimed is:
1. A display module comprising:
    a base member comprising a first portion, a second portion extending from the first portion, and a third portion extending from the second portion;
    a circuit layer on the first portion of the base member, and comprising a plurality of transistors;
    a light emitting element layer on the circuit layer, and comprising a plurality of light emitting elements electrically connected to the plurality of transistors;
    an encapsulation layer configured to seal the light emitting element layer;
    a first sensor on the encapsulation layer; and
    a second sensor on the third portion of the base member to detect a pressure applied from the outside, wherein when the second portion of the base member is bent, the second sensor overlaps the first portion of the base member.

2. The display module of claim 1, further comprising:
a plurality of pads comprising a plurality of first pads configured to transmit an electrical signal to the plurality of transistors, a plurality of second pads electrically connected to the first sensor, and a plurality of third pads electrically connected to the second sensor, and overlapping the third portion of the base member;
a printed circuit board electrically connected to the plurality of pads; and
an input sensing driving circuit mounted to the printed circuit board and electrically connected to the plurality of second pads and the plurality of third pads.

3. The display module of claim 2, further comprising a data driving circuit between the plurality of pads and the second sensor and electrically connected to the plurality of first pads.

4. The display module of claim 1, wherein the second sensor comprises a plurality of electrodes, and
when a pressure is applied from the outside, a capacitance provided by the plurality of electrodes is varied.

5. The display module of claim 1, wherein the second sensor comprises a strain gauge.

6. The display module of claim 1, wherein the first sensor is the same contained in material as the second sensor.

7. The display module of claim 1, wherein the first portion, the second portion, and the third portion are integrated with each other to provide the base member, and
each of the first portion, the second portion, and the third portion comprises polyimide (PI).

8. The display module of claim 1, further comprising a cushion that contacts a portion of the second sensor.

9. A display device comprising:
a display module configured to display an image; and
a set member configured to accommodate the display module,
wherein the display module comprises:
a base member comprising a first portion, a second portion extending from the first portion, and a third portion extending from the second portion;
a circuit layer on the first portion of the base member, and comprising a plurality of transistors;
a light emitting element layer on the circuit layer, and comprising a plurality of light emitting elements electrically connected to the plurality of transistors;
an encapsulation layer configured to seal the light emitting element layer;
a first sensor on the encapsulation layer; and
a second sensor on the third portion of the base member to detect a pressure applied from the outside,
wherein when the second portion of the base member is bent, the second sensor overlaps the first portion of the base member.

10. The display device of claim 9, wherein the display module further comprises:
a plurality of pads comprising a plurality of first pads configured to transmit an electrical signal to the plurality of transistors, a plurality of second pads electrically connected to the first sensor, and a plurality of third pads electrically connected to the second sensor, and overlapping the third portion of the base member;
a printed circuit board electrically connected to the plurality of pads; and
an input sensing driving circuit mounted to the printed circuit board and electrically connected to the plurality of second pads and the plurality of third pads.

11. The display device of claim 10, wherein the set member comprises:
a bottom part comprising a protruding portion overlapping the second sensor; and
a side part extending from a side of the bottom part.

12. The display device of claim 11, further comprising a cushion between the protruding portion of the bottom part and the second sensor.

13. The display device of claim 11, wherein the second sensor comprises:
a first sensor part overlapping the protruding portion and adjacent to a surface of the base member; and
a second sensor part overlapping the protruding portion and adjacent to a surface of the protruding portion, and
the display device further comprises a cushion between the first sensor part and the second sensor part.

14. The display device of claim 10, wherein the display module further comprises a data driving circuit between the plurality of pads and the second sensor, and the data driving circuit is electrically connected to the plurality of first pads.

15. The display device of claim 9, wherein the second sensor comprises a plurality of electrodes, and
when a pressure is applied from the outside, a capacitance provided by the plurality of electrodes is varied.

16. The display device of claim 9, wherein the second sensor comprises a strain gauge.

17. The display device of claim 9, wherein the image comprises a home button image at a fixed position of the display device, and
the second sensor overlaps the home button image.

18. A display module comprising:
a base member comprising a first portion, a second portion extending from the first portion, and a third portion extending from the second portion;
a blocking layer comprising a plurality of metal patterns on the base member;
a circuit layer on the blocking layer, and comprising a plurality of transistors overlapping the first portion of the base member, wherein the plurality of transistors comprise a plurality of activation members; and
a light emitting element layer on the circuit layer, and comprising a plurality of light emitting elements electrically connected to the plurality of transistors,
wherein the plurality of metal patterns of the blocking layer comprise:
a first metal pattern overlapping the plurality of activation members;
a second metal pattern overlapping the first portion of the base member; and
a third metal pattern overlapping the third portion of the base member and electrically connected to the second metal pattern.

19. The display module of claim 18, further comprising a printed circuit board electrically connected to the third metal pattern; and
an input sensing driving circuit mounted to the printed circuit board and electrically connected to the third metal pattern.

20. The display module of claim 19, wherein the input sensing driving circuit is to detect variation of a capacitance of the second metal pattern or variation of a resistance value of the second metal pattern.

* * * * *